United States Patent Office 3,296,215
Patented Jan. 3, 1967

3,296,215
SYNTHETIC LINEAR POLYCARBONAMIDES HAVING AN IMPROVED RECEPTIVITY FOR ACID DYES
Lawrence Worth Crovatt, Jr., Raleigh, N.C., assignor to Monsanto Company, a corporation of Delaware
No Drawing. Filed Dec. 30, 1963, Ser. No. 334,589
9 Claims. (Cl. 260—78)

This invention relates to new and useful compositions of matter. More particularly it relates to synthetic linear polycarbonamides having an in proved receptivity for acid dyes and to a process for producing the same.

The polymeric substances with which this invention is concerned are synthetic, high molecular weight, fiber forming polycarbonamides of the general type characterized by the presence of recurring carbonamide groups as an integral part of the polymer chain, wherein such groups are separated by at least 2 carbon atoms. They are further characterized by high melting point, pronounced crystallinity, and insolubility in most solvents except mineral acids, formic acid and the phenols. Upon hydrolysis with strong mineral acids the polymers revert to the reactants from which they were formed.

The simple polyamides of this type are usually made by heating substantially equimolecular proportions of a diamine and a dicarboxylic acid until the product has polymerized to the fiber forming stage, which stage is not generally reached until the polyamide has an intrinsic viscosity of at least 0.4; the intrinsic viscosity being defined as $$\lim_{C \to 0} \left( \frac{\log_e N_r}{C} \right)$$

in which $N_r$ is the relative viscosity of a dilute solution of a polymer in m-cresol in the same units and at the same temperature, and C is the concentration in grams of polymer per 100 cc. of solution. The polymers thus obtained have high melting points and can be cold drawn to form strong highly oriented fibers.

The diamines and dicarboxylic acids and the amide forming derivatives thereof which can be used as reactants to yield the simple fiber forming polyamides are well known to the art. Suitable diamines are represented by the general formula:

$$NH_2[CH_2]_nNH_2$$

in which $n$ is an integer of 2 or greater and preferably from 2 to 10. Representative examples are ethylene diamine, propylene diamine, tetramethylene diamine, pentamethylene diamine, hexamethylene diamine, octamethylene diamine, and decamethylene diamine. Suitable dicarboxylic acid reactants are represented by the general formula:

$$HOOCRCOOH$$

in which R is a divalent hydrocarbon radical having a chain length of at least 2 carbon atoms. These dicarboxylic acids are illustrated by sebacic acid, octadecanedioic acid, adipic acid, suberic acid, azelaic acid, undecanedioic acid, glutaric acid, pimelic acid, brassylic acid and tetradecanedioic acid. The amide-forming derivatives of diamines which can be employed include the carbamate and N-formyl derivative. Suitable amide forming derivatives of the dibasic carboxylic acids comprise the mono- and diester, the anhydride, the mono- and di-amide and the acid halide.

While it is known that textiles produced from the aforenoted polyamides have some affinity for acid dyestuffs, it is not enough to permit dyeing to the deep shades. Furthermore, the dye uptake rate is relatively slow and places limits on attainable productivity in the manufacture of dyed fabrics and other dyed articles.

Attempts have been made in the past to improve the dyeing characteristics of polyamide fibers and fabrics by treating the same with various chemical agents. However, the chemical treatment of an already formed polymer product merely facilitates dye absorption but does not increase the inherent capacity of the polymer for taking up more dye. Consequently, better methods for enhancing the dyeing characteristics of polyamide fibers and fabrics, particularly with respect to a capability for increasing the capacity of these polymers for taking up greater amounts of acid dyestuffs has been sought for a long time.

It has been disclosed previously that benzene phosphinic acid and certain derivatives thereof render simple polyamide of the type with which this invention is concerned more deeply dyeable. Unfortunately, the use of such additives present certain problems in the manufacture of filaments melt-spun therefrom. For example, when nylon 66 containing hexamethylene diammonium benzylphosphinate as a polymer additive for the accomplishment of deeper dyeing is melt-spun into filaments excessive foaming and increased processing time in the polymer forming stage are experienced. Furthermore, it has been observed that in the formation of filaments there is a greater tendency for buildup of polymeric incrustations around the peripheries of the orifices in the spinneret. The presence of such incrustations gives rise to a very bothersome problem referred to as spinneret drips. In addition yarn melt-spun from polyamides containing a benzylphosphinate compound have poor drawing performance in that breakage of the individual filaments and complete threadline, as well as extraneous raps around the drawing roll, are experienced during the molecular orientation of the yarn.

Accordingly, it is an object of the present invention to prepare synthetic linear polyamides which will dye to deeper shades when dyed with acid type dyestuffs.

Another object is to prepare synthetic linear polyamides which will absorb greater amounts of dye when dyed with acid type dyestuffs.

A further object of the invention is to prepare a polyamide having increased dye affinity by the presence therein of a combination of additives.

These and other objects will become apparent in the course of the following specification and claims.

In general, these objects are accomplished, in accordance with the present invention, by preparing a fiber-forming synthetic linear polycarbonamide by reacting a polyamide-forming composition consisting of substantially equal molecular proportions of a dicarboxylic acid and a diamine in the presence of a particular quaternary dye-enhancing combination of additives. This combination of additives comprises (1) a small amount of pentaerythritol or one of its oligomers, (2) a small amount of benzene phosphinic acid, (3) a small amount of n-aminoethyl piperazine, and (4) a small amount of epsilon-caprolactam.

Of the four additives in the dye enhancing combination, that amount of pentaerythritol used is generally the largest and may be from 0.5 to 10 percent based on the weight of the finished polymer. The optimum amount of this additive used is in the range of 3 to 5 weight percent. In addition to pentaerythritol, its oligomers, dipentaerythritol, tripentaerythritol and tetrapentaerythritol may be used, with tripentaerythritol being the preferred member.

The amount of benzene phosphinic acid used in this system of additives is usually about 0.1 to 1.0 percent based on the weight of the resulting polymer. Not substantially exceeing 1.0 weight percent benzene phosphinic acid in the additive system enables one to avoid excessive foaming in the polymer forming stage. A preferred concentration of the benzene phosphinic acid is in the range of 0.1 to 0.5 weight percent.

The amount of N-aminoethyl piperazine incorporated in the polymer will generally be in the range from 0.1 to 2.0 percent based on the weight of the polymer. The preferred range for this additive is from 0.1 to 0.5 weight percent. If 2.0 weight percent of the piperazine compound in the additive system is not substantially exceeded, excessive spinnerette drip will be avoided.

The amount of epsilon-caprolactam to be used in the combination of additives may be from 0.1 to 5.0 percent based on the weight of the finished polymer. It has been found that by the addition and use of this additive the variable luster which often occurs in filaments made from these polymers is mitigated and often eliminated. A preferred concentration of the epsilon-caprolactam is in the range of 0.7 to 2.0 weight percent.

The modified synthetic linear polyamides as described herein are prepared by procedures well known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber forming properties. This condition is reached when the polyamide has an intrinsic viscosity of at least 0.4 in accordance with the definition of intrinsic viscosity as given hereinabove. The reaction can be constructed at super atmospheric, atmospheric, or sub-atmospheric pressure. Often it is desirable, especially in the last step of the reaction to employ conditions, e.g. reduced pressure, which will aid in the removal of the reaction by-products. The quaternary combination of dye-enhancing additives may be incorporated in the polymer in a various number of ways. One way is to admix the ingredients of the combination of additives with the polyamide salt before the polycondensation reaction takes place. The combination of additives may also be added to the polymerization autoclave with the polyamide forming reactants or separately either before or after the polymerization reaction has begun. Another method of preparing the compounds of this invention is to blend the quaternary combination of additive with the molten polyamide prior to forming the desired shaped article, as for example filaments. The conventional polyamide forming reactants are normally introduced into the polymerization autoclave as a pre-formed salt, but may be in the form of uncombined diamine and dicarboxylic acid when added to the autoclave.

The polyamides having the combination of dye-enhancing additives incorporated therein can be shaped or worked into various forms. For example, the polymer can be melt-spun into yarns, bristles, filaments, films and the like. Articles can be molded from the polyamide and surfaces can be coated therewith.

In the preparation of the polyamides of this invention other modifying agents may be added, for example delustrans, anti-oxidants, plasticizers, etc.

In order to illustrate the invention and the advantages thereof with greater particularity, the following specific examples are given. It should be understood that they are intended to be only illustrative and not limitative. In the examples all parts and percentages are by weight unless otherwise indicated.

*Example I*

This example illustrates the preparation of filaments from a conventional fiber forming polyamide and is to be used as a standard of comparison with the modified polyamides of the present invention.

A solution of 171 parts of hexamethylene diammonium adipate (nylon 66 salt) dissolved in 179 parts of water was added to a stainless steel evaporator which had previously been purged of air with purified nitrogen. A solution was then heated under a nitrogen blanket at a pressure of 13 p.s.i.g. with the continuous removal of steam condensate until the concentrated salt solution reached a temperature of 137° C. At this point the salt solution was piped under pressure to a stainless steel high pressure autoclave. The autoclave had been previously purged of air by the use of purified nitrogen. The temperature and pressure were slowly raised until values of 243° C. and 250 p.s.i.g. respectively were reached, during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25 minute period and the polymer melt was allowed to equilibrate for 30 minutes at 278° C. This finished polymer was then melt-spun directly from the autoclave through a 13 hole spinneret yielding white multi-filament yarn.

*Example II*

This example illustrates the preparation of filaments from a modified polyamide, namely nylon 66 containing 3.0 percent based on the weight of the polymer of tripentaerythritol and is to be used as a further comparison with the modified polyamides of the present invention. A solution of 171 parts of hexamethylene diammonium adipate (nylon 66 salt) dissolved in 179 parts of water was added to a stainless steel evaporator which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the salt solution was charged to a purged stainless steel high pressure autoclave, into which had previously been placed 3.0 percent (based on the weight of the polymer) of tripentaerythritol. The temperature and pressure was slowly raised until values of 243° C. and 250 p.s.i.g. respectively were reached during which time there was a continuous removal of steam as condensate. Also during this period the mixture was continuously stirred by means of a stirring apparatus within the autoclave. At this point the pressure reduction cycle began. The pressure was gradually reduced to atmospheric over a 25 minute period and the polymer melt was allowed to equilibrate for 30 minutes at 278° C. The completed polymer was then melt-spun directly from the autoclave through a 13 hole spinneret yielding white multi-filament yarn.

*Example III*

This example illustrates the preparation of filaments from another modified polyamide, namely nylon 66 and a ternary system of dye enhancing additives and is to be used as still another standard of comparison with the modified polyamides of the subject invention.

A solution of 171 parts of hexamethylene diammonium adipate (nylon 66 salt) dissolved in 179 parts of water was added to a stainless steel evaporator which had previously been purged of air with purified nitrogen. The solution was then heated under a nitrogen blanket at a pressure of 13 p.s.i.g. with a continuous removal of steam condensate until the concentrated salt solution reached a temperature of 137° C. At this point the salt solution was piped under pressure into a purged stainless steel high pressure autoclave into which had previously been placed 0.37 part (0.25 percent based on the weight of the polymer) of benzene phosphinic acid, 0.56 part (0.38 percent based on the weight of the polymer) of N-aminoethyl piperazine, and 1.51 parts (1.02 percent based on the weight of the polymer) of epsilon-caprolactam. The temperature and pressure were slowly raised until values of 243° C. and 250 p.s.i.g. respectively were reached during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25 minute period and the polymer melt was allowed to equilibrate for 30 minutes at 278° C. This finished polymer was then melt-spun directly from the autoclave through a 13 hole spinneret yielding white multi-filament yarn.

*Example IV*

This example and the next succeeding example (Example V) illustrate the preparation of filaments from the modified polyamides of this invention, namely a polyamide containing the quaternary system of dye enhancing additives disclosed herein.

A solution of 171 parts of hexamethylene diammonium adipate (nylon 66 salt) dissolved in 179 parts of water was added to a stainless steel evaporator which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the salt solution was piped under pressure into a stainless steel high-pressure autoclave. The autoclave had previously been purged of air by the use of purified nitrogen. Previous to the introduction of the salt solution the following had been added to the autoclave: 4.44 parts (3.0 percent based on the weight of the polymer) of tripentaerythritol, 0.37 part (0.25 percent based on the weight of the polymer) of benzene phosphinic acid, 0.56 part (0.38 percent based on the weight of the polymer) of N-aminoethyl piperazine, and 1.51 parts (1.02 percent based on the weight of the polymer) of epsilon-caprolactam. The temperature and pressure were slowly raised until values of 243° C. and 250 p.s.i.g. respectively were reached during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25 minute period and the polymer melt was allowed to equilibrate for 30 minutes at 278° C. The finished polymer was then melt-spun directly from the autoclave through a 13 hole spinneret at 280° C. yielding white multi-filament yarn.

*Example V*

A solution of 171 parts of hexamethylene diammonium adipate (nylon 66 salt) dissolved in 179 parts of water was added to a stainless steel evaporator which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the salt solution was charged to a purged stainless steel high-pressure autoclave, into which had previously been placed 7.4 parts (5.0 weight percent) of tripentaerythritol, 0.37 part (0.25 weight percent) of benzene phosphinic acid, 0.56 part (0.38 weight percent) of N-aminoethyl piperazine, and 1.51 parts (1.02 weight percent) of epsilon-caprolactam. The temperature and pressure were slowly raised until values of 243° C. and 250 p.s.i.g. respectively were reached during which time there was a continuous removal of steam as condensate. Also during this period the mixture was continuously stirred by means of a stirring device contained within the autoclave. At this point the pressure reduction cycle began. The pressure was gradually reduced to atmospheric over a 25 minute period and the polymer melt was allowed to equilibrate for 30 minutes at 278° C. The finished polymer was then melt-spun directly from the autoclave through a 13 hole spinneret at 280° C. yielding white multi-filament yarn.

In order to demonstrate the practical usefulness of the modified polyamides of the present invention, comparative tests of the above examples were conducted to determine relative receptivity for acid dyestuffs. Samples of the yarn of each of the above examples were dyed with comparable concentrations (7.5 percent based on the weight of the yarn) of the commercial dyestuff, Scarlet 4 RA Conc. CF (C. I. Acid Red 18). The dyestuff was conducted in a bath having a liquor to fiber ratio of 40:1 and a pH, adjusted by the use of acetic acid, of 3.1. The bath temperature was maintained at 100° C. and the dyeing period was two hours in length. The dye absorption values were determined by measuring spectrophotometrically the changes in dye bath concentration, i.e., the difference between the original dye concentration and the dye concentration after equilibrium (saturation) conditions had been reached. The following results were obtained:

| Example: | $C\infty$—Equilibrium acid dye absorption value, percent |
|---|---|
| I (Control) | 1.06 |
| II | 2.33 |
| III | 2.40 |
| IV | 3.44 |
| V | 4.13 |

It is readily apparent from the foregoing examples and the test data given in connection therewith that the yarns prepared from the modified polyamides of this invention are markedly improved over yarns prepared from unmodified polyamides in their receptivity for acid dyestuffs. It is noted in the above table that the acid dye absorption, for the yarn prepared from the modified polyamide in accordance with this invention (Example V), is nearly a 300 percent increase over the dye absorption of yarn prepared from a conventional polyamide (Example I–Control). It is also noted that the dye absorption values for the yarns prepared from the modified polyamides of this invention (Examples IV and V) is much greater than the dye absorption values for yarns prepared from a modified polyamide containing only pentaerythritol or one of its oligomers as in Example II, or a modified polyamide containing only a ternary system of dye enhancing additives (a small amount of benzene phosphinic acid, N-aminoethyl piperazine, and epsilon-caprolactam) as in Example III.

Although a particular acid dye was employed in the examples used to illustrate this invention, it is understood, of course, that the advantages of the invention are realized with all acid dyestuffs which are capable of dyeing polyamide articles. Benefits are also realized with other classes of dyes such as neutral metal complex dyes, reactive dyes, premetalized dyes and others.

As many widely different embodiments of this invention may be made without departing from the spirit and scope thereof, it is to be understood that the invention is not to be limited by the specific embodiments set forth herein but only by the claims which follow.

I claim:
1. A fiber-forming synthetic linear polycarbonamide exhibiting improved dye receptivity and having recurring amide groups as an integral part of the main polymer chain, and wherein said groups are separated by at least 2 carbon atoms, which comprises the product obtained from reactants comprising (A) a polyamide-forming composition consisting of substantially equimolecular proportions of a dicarboxylic acid of the formula

HOOCRCOOH wherein R is a divalent hydrocarbon radical having a chain length of at least 2 carbon atoms, and a diamine of the formula $NH_2(CH_2)_nNH_2$ wherein $n$ is an integer of at least 2; (B) from 0.5 to 10 weight percent of a compound selected from the group consisting of pentaerythritol and oligomers thereof; (C) from 0.1 to 1.0 weight percent of benzene phosphinic acid; (D) from 0.1 to 2.0 weight percent of N-aminoethyl piperazine;

and (E) from 0.1 to 5.0 weight percent of epsilon-caprolactam.

2. The fiber-forming synthetic linear polycarbonamide as set forth in claim 1, wherein said polyamide-forming composition, (A), consists of substantially equimolecular proportions of adipic acid and hexamethylene diamine.

3. The fiber-forming synthetic linear polycarbonamide as set forth in claim 1, wherein said oligomer of pentaerythritol, (B), is tetrapentaerythritol.

4. The fiber-forming synthetic linear polycarbonamide as set forth in claim 1, wherein said oligomer of pentaerythritol, (B), is dispentaerythritol.

5. The fiber-forming synthetic linear polycarbonamide as set forth in claim 1, wherein (B) is pentaerythritol.

6. A textile fiber of the polycarbonamide as defined in claim 1.

7. A fiber-forming synthetic linear polycarbonamide exhibiting improved dye receptivity and having recurring amide groups as an integral part of the main polymer chain, and wherein said groups are separated by at least 2 carbon atoms, which comprises the product obtained from reactants comprising (A) a polyamide-forming composition consisting of substantially equimolecular proportions of a dicarboxylic acid of the formula

HOOCRCOOH wherein R is a divalent hydrocarbon radical having a chain length of at least 2 carbon atoms, and a diamine of the formula $NH_2(CH_2)_nNH_2$ wherein $n$ is an integer of at least 2; (B) about 0.5–10.0 weight percent of tripentaerythritol; (C) about 0.1–1.0 weight percent of benzene phosphinic acid; (D) about 0.1–2.0 weight percent of N-aminoethyl piperazine; and (E); about 0.1–5.0 weight percent epsilon-caprolactam.

8. A fiber-forming synthetic linear polycarbonamide exhibiting improved dye receptivity and having recurring amide groups as an integral part of the main polymer chain, and wherein said groups are separated by at least 2 carbon atoms, which comprises the product obtained from reactants comprising (A) a polyamide-forming composition consisting of substantially equimolecular proportions of a dicarboxylic acid of the formula

HOOCRCOOH wherein R is a divalent hydrocarbon radical having a chain length of at least 2 carbon atoms, and a diamine of the formula $NH_2(CH_2)_nNH_2$ wherein $n$ is an integer of at least 2; (B) 3.0–5.0 weight percent of tripentaerythritol; (C) 0.1–0.5 weight percent of benzene phosphinic acid; (D) 0.1–0.5 weight percent of N-aminoethyl piperazine; and (E), 0.7–2.0 weight percent epsilon-caprolactam.

9. The fiber-forming synthetic linear polyamide as set forth in claim 1 wherein (B) is present in an amount between 3.0 and 5.0 weight percent, (C) is present in an amount between 0.1 and 0.5 weight percent, (D) is present in an amount between 0.1 and 0.5 weight percent and (E) is present in an amount between 0.7 and 2.0 weight percent.

References Cited by the Examiner

UNITED STATES PATENTS

| | | | |
|---|---|---|---|
| 2,359,833 | 10/1944 | Faris | 260—78 |
| 2,456,271 | 12/1948 | Graham | 260—78 |
| 2,510,777 | 6/1950 | Gray | 260—78 |
| 2,855,267 | 10/1958 | Zimmerman | 260—78 |
| 2,904,536 | 9/1959 | Reith | 260—78 |
| 2,985,628 | 3/1961 | Caldwell et al. | 260—78 |
| 3,078,248 | 2/1963 | Ben | 260—78 |

WILLIAM H. SHORT, *Primary Examiner.*

LOUISE P. QUAST, *Examiner.*

SAMUEL H. BLECH, H. D. ANDERSON,
*Assistant Examiners.*